Patented July 18, 1939

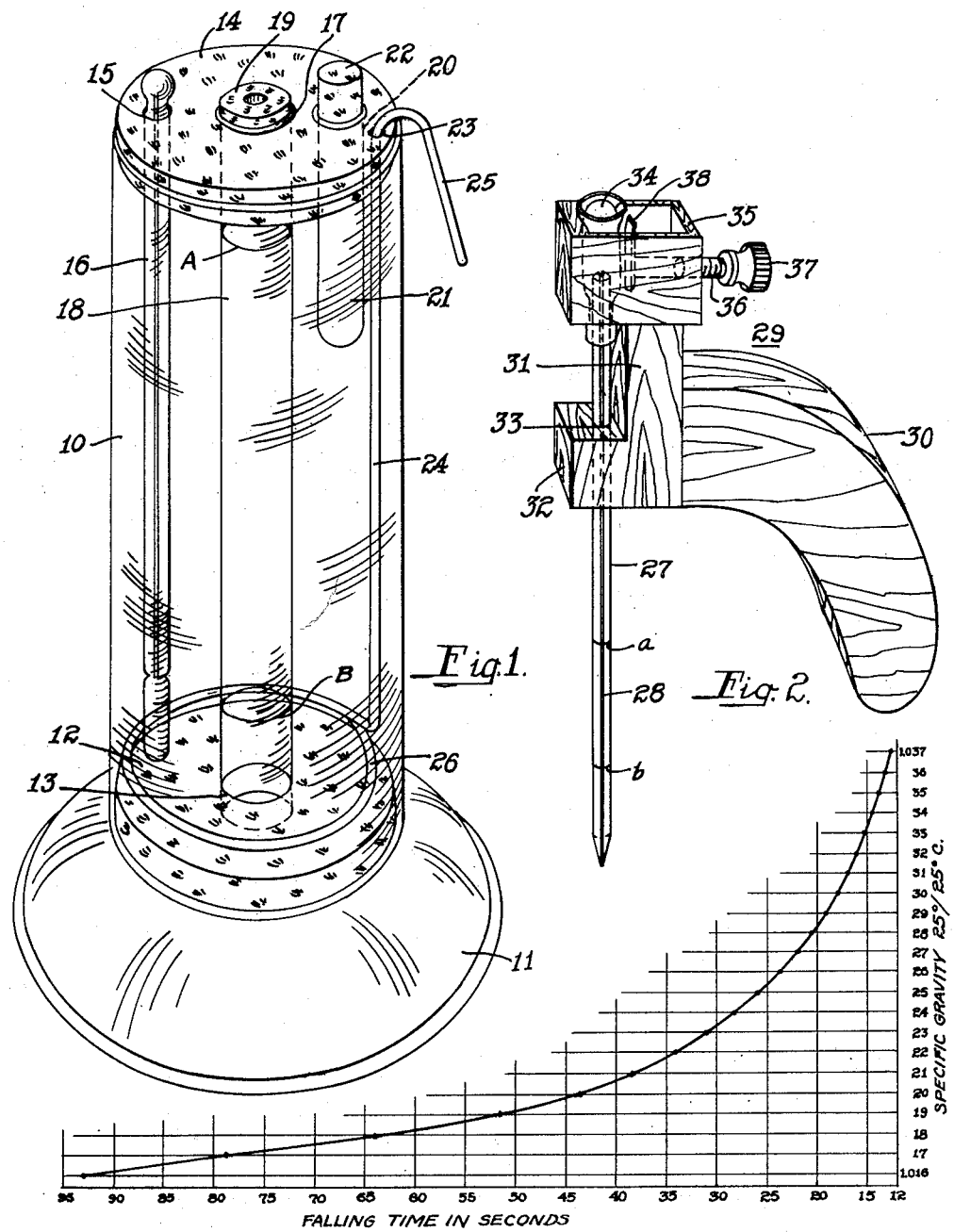

2,166,842

UNITED STATES PATENT OFFICE 2,166,842

APPARATUS FOR DETERMINING THE SPECIFIC GRAVITY OF LIQUID MEDIA AND THE PROTEIN CONTENT OF BLOOD

Benjamin M. Kagan, Baltimore, Md.

Application October 19, 1937, Serial No. 169,793

2 Claims. (Cl. 73—51)

My present invention relates to the determination of the specific gravity of various liquids and liquid media which are non-miscible with the composition in which the determination is made and more particularly concerns an apparatus for accurately and rapidly making such determinations based upon Stokes' law.

In connection with chemical and medical research in particular it is frequently necessary or desirable rapidly and accurately to determine the specific gravity of a liquid or a series of liquids or liquid media for various purposes. In respect of medical research, the determination of the specific gravity of blood, plasma or sera is frequently necessary for analytical and clinical purposes, particularly where it is desired to determine (estimate) the protein content of such blood, plasma or sera. An accurate determination of specific gravity of blood serum, for example, enables its protein content to be readily and closely estimated because it has been found that there is a sufficiently definite relationship between the specific gravity and the protein content of such to make this possible.

There are, of course, several ways now known for the determination of specific gravity, but most of these are difficult and complicated and require considerable time. For example, it has been considered in the past that the most accurate methods for determining total serum proteins are the gravimetric and the macro-Kjeldahl. Due to the difficult and time-consuming nature of such methods the profession has turned to the so-called refractive index method and although this has been widely used, it is expensive and it is frequently inaccurate. Since the discovery of the relationship between specific gravity and protein content of plasma and serum, proteins have been determined by means of specific gravity determinations but these specific gravity determinations have been made by pycnometric methods which require the use of a pycnometer and a delicate balance. While this is a far more accurate method than the refractive index method, its difficulty and sensitiveness have prevented its wide use.

It is, accordingly, one of the objects of my present invention to make possible the accurate and rapid determination of the specific gravity of certain liquid media by a simple and easy apparatus and from which specific gravity determination, in the case of blood, the protein content of the blood can be easily estimated.

Another object of my invention resides specifically in making it possible to determine specific gravity and hence to estimate the protein content of blood without the use of any difficult or complicated manipulations or apparatus and in such manner that the entire determination and estimation can be made within a few minutes.

A still further object of my invention resides in a simple apparatus whereby the present objects and advantages can be achieved without recourse to any special, difficult or expensive procedural or mechanical details.

More specifically, the present invention comprises as an object the accurate and rapid determination of specific gravity and, in the case of blood, the protein content by the so-called "falling drop" method based upon Stokes' law.

Other and further objects and advantages will be understood by those skilled in this art or will be apparent or pointed out hereinafter.

In the accompanying drawing wherein I have illustrated a form of apparatus by means of which the present invention may be realized:

Figure 1 is a perspective view of the basic equipment employed;

Fig. 2 is a perspective view of a device for delivering standard drops of known size; and Fig. 3 is a graph showing the relationship between falling time and specific gravity.

First referring to the drawing and describing the apparatus forming a part of my present invention, the numeral 10 indicates a cylindrical container of glass or other transparent material which rests upon a suitable base 11 as shown, the base being suitably recessed to receive the container 10 and being made out of any suitable non-metallic or metallic material. Resting upon the bottom of the cylinder 10 is a non-metallic or metallic disc 12 made of a suitable material, such as cork, aluminum, rubber, or the like. This disc 12 is provided with a central hole 13, as shown. The upper end of the cylinder 10 is provided with a similar disc 14 of such size as to be snugly received therewithin and of such material as to minimize the possibility of breaking the cylinder. The upper disc 14 is provided with a hole 15 through which thermometer 16 passes and the bulb of the thermometer is adjacent the lower end of the glass cylinder 10. The upper disc 14 is also provided with a central aperture 17 of such size as to permit passage therethrough of central glass tube 18, the upper end of which is provided with a one-hole stopper 19 for a purpose to be hereinafter described.

It will be noted that central glass tube 18 is provided with two marks A and B etched, drawn or otherwise placed thereon which are spaced a predetermined known distance apart. The upper disc 14 is also provided with one or more holes, such as that marked 20, for the reception of short glass tubes 21, each of which contains a medium whose specific gravity is to be determined and each such tube is preferably closed with a solid stopper 22 to prevent access of air to the medium. The upper disc is provided with a hole 23 through which passes a stirring rod of suitable design and configuration, such as that shown, which comprises a vertical portion 24, an angularly extending handle portion 25 and a circular bottom piece 26 which has a diameter such that in moving the stirring rod vertically upwardly and downwardly it will clear the thermometer 16.

The outer glass cylindrical container 10 is filled with water substantially to its top and thus constitutes a water bath of sufficient volume to maintain a substantially constant temperature during the short period in which the determinations are being made. The central glass tube 18 is filled with a special oily composition which is composed of heavy California mineral oil and methyl salicylate, no specific proportions of which can be given by way of generalization for reasons which will become apparent hereinafter. However, in any given determination the proportions of mineral oil and methyl salicylate are so chosen as to produce a composition having a specific gravity close to but less than that of the medium whose specific gravity is to be determined. The short glass tube 21 contains the blood, serum or other medium, whose specific gravity is to be determined and by keeping this as shown in Figure 1 it will be apparent that the temperature of this medium is the same as the temperature of the oily composition, thus making it possible to determine the specific gravity with a single correction factor as will be appreciated by those versed in such matters.

In Fig. 2 a device is illustrated by means of which standard size drops can be discharged through the hole in stopper 19 into the composition within central glass tube 18. This device includes a capillary tube or pipette 27 which is provided with two marks $a$ and $b$ on its surface which are a predetermined distance apart, depending upon the bore 28 of the pipette. The pipette passes through a holding device 29, shown as being made of wood, which comprises a handle portion 30 attached to an upright furcated portion 31, the latter having a right-angled extension 32 provided with a hole 33 through which the pipette passes. Above extension 32 the pipette is provided with a rubber bulb 34 disposed within a box-like top portion 35 through one wall of which passes the shank 36 of a screw 37. Between the screw and the rubber bulb is a metal plate 38 which may be suitably secured in place and which is adapted to compress or release the bulb depending upon the direction of rotation of the screw.

Stokes' law indicates that the rate of fall of a small solid sphere in a viscous fluid is a function of the radius and specific gravity of the sphere, the specific gravity and the viscosity of the viscous fluid and the acceleration due to gravity. This law may be represented by the formula:

$$V = \frac{2ga^2(d_1-d_2)}{9\eta}$$

and wherein $a$ represents the radius of the sphere in centimeters, $g$ represents the gravitational factor in cms/sec.$^2$, $d_1$ represents the density of the sphere in grams per cubic centimeter, $d_2$ represents the density of the medium through which the sphere falls in the same units as $d_1$, $\eta$ represents the coefficient of viscosity and V represents velocity in cms.$^3$/sec.

By referring to the formula it will be understood that if $g$, $a$, $\eta$, V and $d_2$ are known or determined the value of $d_1$ can be readily obtained. My present invention involves the application of this law or formula to a determination of specific gravity by the accurate measurement of velocity as determined by the rate of fall of a spherical drop of the medium through the composition above referred to. By using a drop of liquid in a medium in which it is insoluble, the drop simulates a solid sphere and thus satisfies Stokes' law. The gravitational factor is readily ascertained for any given locality and the value of $a$ can be predetermined by discharging a known sized drop. $d_2$ is readily determined, i. e., by pycnometric methods or in any other suitable manner and the value of $\eta$ can likewise be readily ascertained. Therefore, by measuring velocity it is clear that the value of $d_1$ can be determined. My present invention involves the determination of the value of V in the above formula and I will now describe how this is accomplished.

As already indicated, the glass cylinder 10 is filled with water close to its top and the exact temperature thereof is indicated by the thermometer 16 which is designed to indicate temperatures between 0 and 50° C. reading in 0.1° C. The central glass tube 18 is of a definite inside diameter between 10 and 40 millimeters and the length of the tube may be anywhere from 15 to 35 centimeters. The water bath must be such as to cover the entire length of central tube 18 excepting a few centimeters of the top. The marks A and B on the central tube are preferably exactly ten centimeters apart but may be anywhere from about ten centimeters to about 30 centimeters, depending upon the conditions of any particular determination and the distance through which a drop should be caused to fall to make an accurate determination.

The central tube 18 is filled within a centimeter or thereabouts of the top with the mixture of heavy California mineral oil and methyl salicylate U. S. P. as above pointed out. With these ingredients a composition can be prepared varying in specific gravity from 1.000 to 1.080. Thus for blood serum which has a range of specific gravity of 1.0160 to 1.0360 at 25°/25°, a mineral oil-methyl salicylate mixture is used which has a specific gravity of 1.0130, this specific gravity being sufficiently close to but less than the specific gravity of the serum so as to cause the drop of serum to fall fairly slowly through the mixture to permit accurate determination of the time required for the drop to pass from the upper mark A to the lower mark B of the central tube. This time interval is measured with a stopwatch or other suitable chronometer.

Serum or other medium whose specific gravity is to be determined having been placed in tube 21 for a sufficient length of time to insure its being at the same temperature as the composition in tube 18, the pipette 27 is dipped thereinto and the medium drawn up to a point above the upper mark $a$ thereon, this being accomplished by previously having collapsed the rubber bulb 34 and then retracting the screw to permit the pipette to suck up serum or other medium. By proper manipulation of the screw in known manher the level of serum or medium in the pipette is made to coincide exactly with the upper mark *a*. Then the pipette is entered into the hole in stopper 19 of central tube 18 and the screw manipulated until the pipette discharges serum or other medium sufficient to lower the level within the pipette to the lower mark *b*. The bore of pipette is preferably such that the amount of serum or other medium contained between marks *a* and *b* thereof is an exact value between 10–15 cmm. Upon delivery of this amount of serum or medium the pipette is withdrawn and a drop forms in the composition which assumes a spherical or substantially spherical form and begins to fall relatively slowly through the composition in tube 18. By means of a stop-watch or other accurate chronometer the interval of time is noted and then recorded which the drop required to pass from mark A to mark B on central tube 18. By reference to charts and tables previously prepared for this purpose and by making a single consolidated correction for temperature the specific gravity corresponding to the determination as above made can be readily obtained by a direct chart or table reading.

One such chart is illustrated in Fig. 3 and shows the relationship between falling time and specific gravity. The chart (Fig. 3) indicates that the falling time in seconds decreases with increasing specific gravity. In other words, the heavier the medium the less time it takes to fall a given distance under the conditions set forth. For example, a medium a drop of which required 26 seconds to fall a given distance through the oily composition described will have a specific gravity of 1.025 whereas a medium a drop of which required 79 seconds to fall the same distance under the same conditions will have a specific gravity of 1.017. By referring any falling time in the range of 12–95 seconds to the chart of Fig. 3 the specific gravity can be obtained at 25°/25° C.

The entire operation of determining specific gravity in the above manner can be carried out within five minutes with an accuracy of not less than $1 \times 10^{-4}$ and the protein content of blood serum estimated with a mean deviation from the value determined by macro-Kjeldahl of less than 0.2 gm.% and a maximum of 0.48 gm.%. This compares very favorably with pycnometric methods and far excells the refractive index as a measure of protein because the latter is frequently as inaccurate as 1.5 gm.%. In other words, my short, rapid, easy determination is on the average about twice as accurate as results obtained in much more expensive ways such as by use of refractometers and more accurate than results obtained in the slow painstaking ways such as use of small pycnometers.

It is to be understood, of course, that the above apparatus must be calibrated. The necessity and manner of calibrating instruments is well known and requires no special discussion or explanation except that I preferably calibrate the apparatus on standard salt solutions by pycnometric methods since these are generally accepted as the most accurate now used. From these results the necessary charts, tables and correction factor are secured.

It will be understood that any liquid whose density is within the range of possible mixtures of the oily composition used and which is not miscible therewith may have its specific gravity determined in accordance with the foregoing.

While I may carry out the determinations at any temperature, I have found it to be more convenient to accomplish the same at room temperature and to make a correction to bring it to the desired temperature as will be understood by those familiar with these matters. The temperature of the water bath may be varied according to the temperature range desired but having been brought to the desired temperature it is maintained constant at that temperature.

I have found that the foregoing invention is particularly useful for the determination of the specific gravity of blood, sera and plasma and that in the light of the known relationship between specific gravity and protein content it is easy to obtain an estimate or value of the total protein content of any such medium with an accuracy sufficient for clinical requirements. This relationship between specific gravity and the protein content of serum or plasma may be expressed as follows:

P=340 (G—1.0099)—for oxalated plasma
P=343 (G—1.0070)—for heparinized plasma
P=345 (G—1.0076)—for serum wherein P represents the grams of protein per 100 cc. of serum or plasma and G the specific gravity. By knowing or determining G it is apparent that P can be readily obtained from these formulae and, as above stated, previous investigators have found in connection with the haparinized plasma formula that the relationship is substantially correct and that there is a definite correlation between protein content and specific gravity as to blood, plasma and sera but, as also pointed out above, the specific gravity has heretofore been determined by complicated, expensive and what have proved to be less desirable methods than that invented by me. The relationships expressed by the above formulae are put in graph or chart form as will be readily understood.

Instead of using a capillary pipette as illustrated and described in connection with Fig. 2, I may employ a so-called definite drop surface tube and such is to be considered a part of the present invention.

The foregoing, as to the apparatus described, are intended as illustrative rather than limitative and I may make suitable modifications, variations, substitutions and omissions within the principles and scope thereof without departing from the invention. All such are deemed to be a part hereof and are intended to be covered by the appended claims.

The particular sizes of and materials used for the apparatus may be such as will be indicated in any given case as will be appreciated by those versed in matters of this kind. I, however, prefer to use a short tube 18 as the temperature of the composition can be more easily maintained constant and I find that the mineral oil-methyl salicylate composition permits the use of a shorter tube. By maintaining the temperature of the medium and the composition the same the determination is greatly simplified.

While I have above described a constant temperature bath containing only a single tube 18, it is within the purview and scope of my invention to utilize a constant temperature bath of sufficient size to enable a plurality of tubes 18 to be provided therein, each of which is as already described in connection with the single tube 18. The provision of a plurality of tubes 18 enables oily compositions of different mixtures or specific gravities to be maintained at one and the same time so that media of various specific gravities can be used or so that the specific gravity of a number of media can be successively and rapidly determined. For example, the specific gravity of whole blood may be determined in one tube 18, serum in another, and urine in another.

Having thus described my invention, what I claim as new and desire to secure by Letters Patent is:

1. In an appparatus of the character described, a base, a cylindrical container mounted on said base, a transparent tube adapted to contain an oily composition and centrally disposed within said cylindrical container, two resilient discs one disposed in the bottom and one in the top of said cylindrical container in both of which the central tube is fixed, one or more tubes for liquid medium extending from said top disc partway into said cylindrical container, a thermometer and a stirring rod passing through said top disc and extending downwardly into said container, means for collecting liquid medium of known quantity and for discharging a drop thereof of known size into said centrally disposed tube comprising a rigid block containing a screw which operates upon a metal plate which in turn operates upon a hollow rubber tube or bulb into which bulb a pipette fits.

2. In an apparatus of the character described, a base, a cylindrical container mounted on said base, a transparent tube centrally disposed within said cylindrical container, two resilient discs one disposed in the bottom and one in the top of said cylindrical container in both of which the central tube is fixed, one or more tubes for liquid medium extending from said top disc partway into said cylindrical container, a thermometer and a stirring rod passing through said top disc and extending downwardly into said container, means for collecting liquid medium and for discharging a drop thereof of known size into said centrally disposed tube, and said centrally disposed tube being substantially filled with a composition such as a mixture of heavy California mineral oil and methyl salicylate in such proportions as to produce a composition having a specific gravity close to but less than that of the medium whose specific gravity is to be determined.

BENJAMIN M. KAGAN.